United States Patent [19]

Pazdernik

[11] Patent Number: 5,201,823

[45] Date of Patent: Apr. 13, 1993

[54] CONTAINER METERING DEVICE HAVING MECHANICALLY FORCED SEPARATION

[75] Inventor: Irvan L. Pazdernik, Alexandria, Minn.

[73] Assignee: APV Douglas Machine Corporation, Alexandria, Minn.

[21] Appl. No.: 904,219

[22] Filed: Jun. 25, 1992

[51] Int. Cl.[5] .............................................. B65G 47/26
[52] U.S. Cl. .................................. 198/419.3; 198/426
[58] Field of Search ............... 198/418.7, 419.1, 419.2, 198/419.3, 426, 484.1, 459, 461

[56] References Cited

U.S. PATENT DOCUMENTS

| | | | |
|---|---|---|---|
| 3,872,647 | 3/1975 | Langen et al. | 198/419.3 X |
| 4,354,590 | 10/1982 | Langen | 198/426 |
| 4,552,261 | 11/1985 | Raudat et al. | 198/419.3 |
| 4,776,448 | 10/1988 | Kulig | 198/418.7 X |
| 4,832,178 | 5/1989 | Anderson et al. | 198/419.3 X |
| 4,962,625 | 10/1990 | Johnson, Jr. et al. | 198/419.1 X |
| 5,070,993 | 12/1991 | Fransen | 198/419.3 |

FOREIGN PATENT DOCUMENTS 2131383  6/1984  United Kingdom ............. 198/419.3

*Primary Examiner*—Robert P. Olszewski
*Assistant Examiner*—James R. Bidwell
*Attorney, Agent, or Firm*—Peterson, Wicks, Nemer & Kamrath

[57] ABSTRACT

A container metering device (10) is disclosed including longitudinally split pins (12) having first and second portions (12a, 12b). The second portions (12b) are mounted to cross bars (16) mounted on and around a roller chain (18) in the form of an endless loop. The first portions (12a) are mounted to a shaft (70) rotatably mounted relative to the cross bars (16) for pivotal movement relative to the second portions (12b) between a first, abutting position insertable into the windows between adjacent containers (14) in a packaging lane and a second, open position. The cross bars (16) include cam followers (20) for engaging a cam track (26) of a cam support (24) for changing the pitch between adjacent pins (12) of the endless loop. Cam followers (74) are mounted on the free ends of crank arms (76) secured to the shafts (70) for engaging a second cam track (82) adjustably mounted on the cam support (24) for pivoting the first portions (12a) relative to the second portions (12b). In operation, the containers (14) moving on the conveyor (54) are held by the second portions (12b) and slide on the conveyor (54) until gradually released by the second portions (12b). As the second portions (12b) gradually release the containers (14), the first portions (12a) simultaneously pivot from their abutting position to their open position to mechanically separate the containers (14) so that the friction between the containers (14) and the conveyor (54) is not depended upon for consistent gap separation.

20 Claims, 2 Drawing Sheets

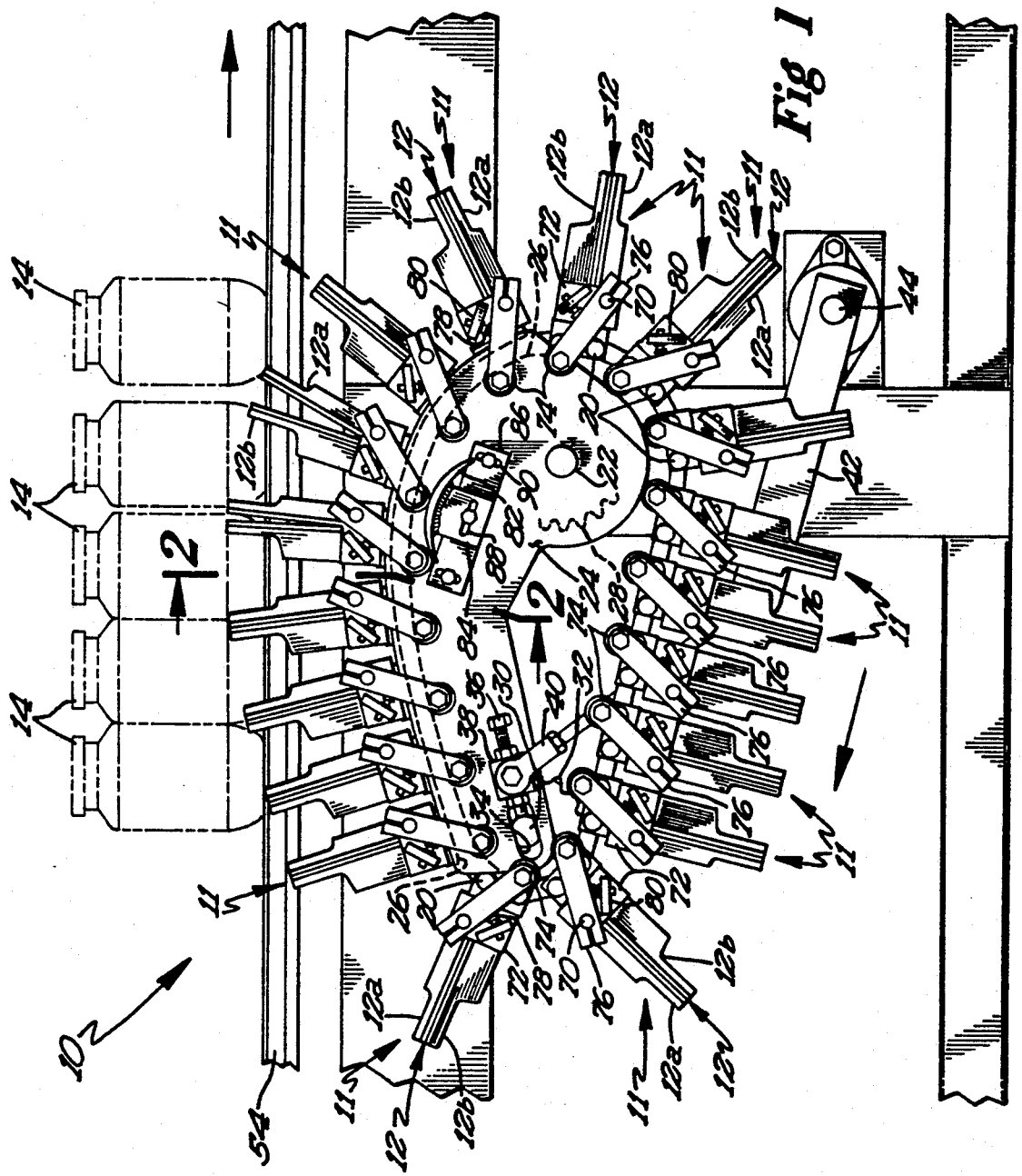

CONTAINER METERING DEVICE HAVING MECHANICALLY FORCED SEPARATION

BACKGROUND

The present invention relates to metering devices, specifically to container metering devices, more specifically to container metering devices which force separation between the containers, and particularly to container metering devices especially adapted for use in packaging machines.

In a typical packaging operation, containers come to a packaging machine in a single random lane. The containers are then grouped and divided into lanes corresponding to the eventual pack pattern in the packaging for the containers. Each of the lanes must then be controlled as to the number of containers released to give the total number required for the pack pattern. This control is accomplished by providing a separation between the containers in the lane to allow mechanical counting, to allow introduction of an overhead flight, or for the like. An example of one type of metering device which has enjoyed commercial success is shown and described in U.S. Pat. No. 4,832,178.

In the operation of the device of U.S. Pat. No. 4,832,178, the containers are held by pins while the table-top conveyor slides underneath until the particular pins for the row of containers retracts below the tabletop conveyor allowing the row of containers to be released and travel with the table-top conveyor creating a gap between that row of containers and the next row of containers. It can then be appreciated that product separation is completely dependent on the friction between the containers and the table-top conveyor that moves the product. However, this friction can be inconsistent because the condition of the table-top conveyor varies due to water and/or product from the containers being spilled on the table-top conveyor. Thus, even though the pins have been withdrawn below the table-top conveyor, the containers can have a tendency to continue to slide on the table-top conveyor rather than travel with the table-top conveyor. If this occurs, the gap or separation between containers can be nonexistent or inconsistent. Consistent separation is required to allow efficient mechanical counting, the introduction of overhead flights, and the like. This has been a particular problem for high-speed operation and for greasy-type products such as tomato paste.

A need has arisen for a method providing separation of a range of varying sized products which can be easily and simply achieved when it is desired to meter different sized containers without the use of change parts and which mechanically separates the rows of containers.

SUMMARY

The present invention solves this need and other problems in the area of container metering by providing, in a first preferred aspect, longitudinally split pins having first portions movable relative to second portions between an abutting position and an open position with the pins being insertable into the windows between adjacent containers in a packaging lane when in the abutting position and movable thereafter to the open position where the first portion is spaced from the second portion to gap the containers in the lane.

It is thus an object of the present invention to provide a novel device for metering containers.

It is further an object of the present invention to provide such a novel container metering device which forces separation between the containers.

It is further an object of the present invention to provide such a novel container metering device which mechanically separates the containers.

It is further an object of the present invention to provide such a novel container metering device which does not require a separate drive system for mechanically separating the containers.

It is further an object of the present invention to provide such a novel container metering device which is not dependent on the friction between the container and the table-top conveyor.

It is further an object of the present invention to provide such a novel container metering device which is mechanically simple.

It is further an object of the present invention to provide such a novel container metering device especially adapted for use in packaging machines.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where:

FIG. 1 shows an end elevational view of a container metering device according to the preferred teachings of the present invention.

Figure 4:
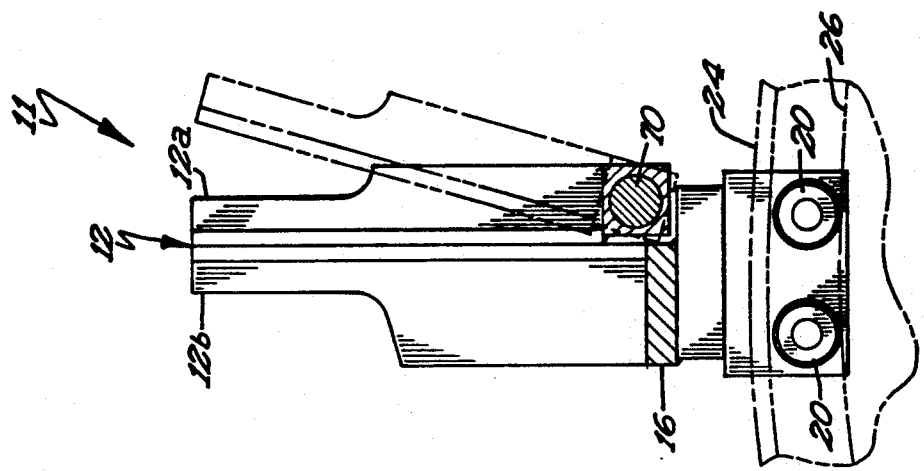
FIG. 4 shown a sectional view of the container metering device of FIG. 1 according to section line 4—4 of FIG. 2.
Figure 3:
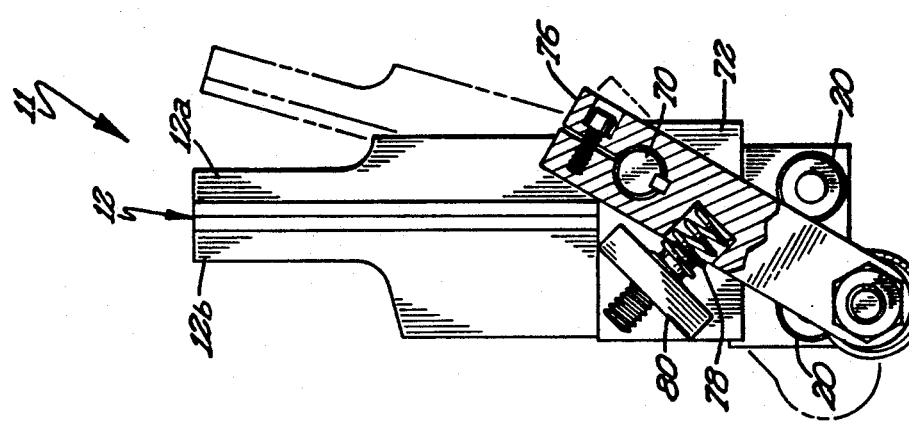
FIG. 3 shows an end view of a bar of the pin system of the container metering device of FIG. 1 with portions broken away.
Figure 2:
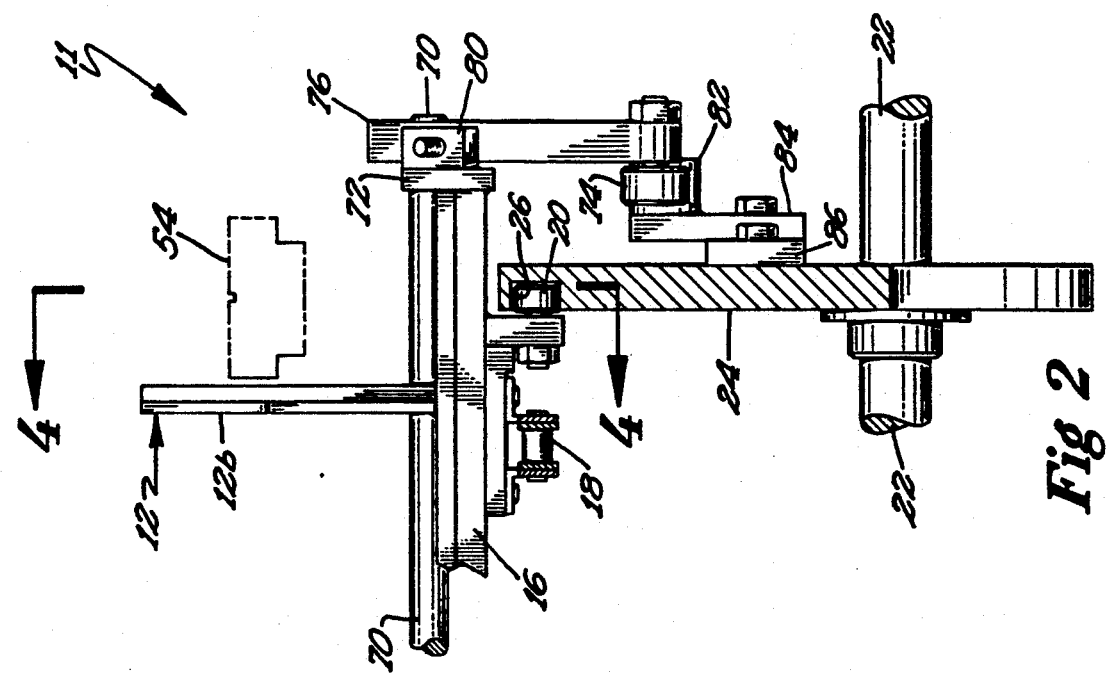
FIG. 2 shows a sectional view of the container metering device of FIG. 1 according to section line 2—2 of FIG. 1.

All figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "top", "bottom", "first", "second", "leading", "trailing", "end", "side", and similar terms are used herein, it should be understood that these terms have reference only to the structure shown in the drawings as it would appear to a person viewing the drawings and are utilized only to facilitate describing the invention.

DESCRIPTION

A device for metering containers such as bottles and cans on the infeed to a packaging machine according to the preferred teachings of the present invention is shown in the drawings and generally designated 10. In the most preferred embodiment of the present invention, metering device 10 is of the type shown and described in U.S. Pat. No. 4,832,178. For purpose of explanation of the basic teachings of the present invention, the same numerals designate the same or similar parts in the present Figures and the Figures of U.S. Pat. No. 4,832,178. The description of the common numerals and metering device 10 may be found herein and in U.S. Pat. No. 4,832,178, which is hereby incorporated herein by reference.

Specifically, in the most preferred form, metering device 10 includes a pin system 11 generally including a plurality of pins 12 corresponding to the number of rows of containers 14 desired to be metered. Pins 12 according to the teachings of the present invention are longitudinally split generally perpendicular to the rows of containers 14, with each of pins 12 including a first, leading portion 12a and a second, trailing portion 12b. Portions 12b of pins 12 are mounted to cross bars 16 mounted on and around a flexible member in the form of an endless loop such as a roller chain 18 as shown. Portions 12a of pins 12 are mounted to a rod in the most preferred form being a shaft 70 extending parallel to and in front of cross bars 16, with shaft 70 being rotatably mounted relative to cross bars 16 such as by end plates 72. It can then be appreciated that portions 12a and 12b are pivotal relative to each other between a first, abutting position and a second, open position extending at an angle from each other. Cam followers 20 are operatively attached to portions 12b of pins 12 by mounting on cross bars 16 opposite pins 12 and in the most preferred form are shown as rollers which are rotatably mounted to brackets extending from cross bars 16. Cam followers 74 are operatively attached to portions 12a of pins 12 by mounting on shaft 70 opposite pins 12 and in the most preferred form are shown as rollers which are rotatably mounted by a crank arm 76 extending from one end of shaft 70. Portions 12a and 12b are biased from their second, open position into their first, abutting position such as by a spring 78 extending between a pedestal 80 fixed to end plate 72 and crank arm 76 in the most preferred form.

System 11 of device 10 further includes a drive shaft 22 which is rotatably supported and driven by any suitable means. Pivotally mounted to shaft 22 are generally elliptically shaped cam supports 24 including cam tracks 26 for engaging and guiding cam followers 20. In the most preferred form, track 26 is in the form of a channel having a French curve shape and a generally rectangular cross section formed in cam support 24. Rotatably fixed to shaft 22 are sprockets 28. Sprockets 28 extend below and beyond the pivotally mounted end of cam supports 24 and cam supports 24 extend above sprockets 28 with cam track 26 also being positioned generally above sprockets 28. A second idler shaft 30 is rotatably mounted between the free ends of cam supports 24 and includes a second set of sprockets 32 rotatably mounted thereto, with sprockets 32 in the preferred form having a diameter generally equal to the diameter of sprockets 28. In the most preferred form, shaft 30 is mounted in elongated slots 34 formed in cam supports 24 to allow chain tightness adjustment in any usual manner such as by use of a bolt 36 threadably mounted to a pedestal 38 formed on cam support 24. Sprockets 32 extend below and beyond the free end of cam supports 24 and cam supports 24 extend above sprockets 32 with cam track 26 also being positioned generally above sprockets 32. It can then be appreciated that cross bars 16 and roller chain 18 are supported by cam support 24 and sprockets 28 and 32 with cross bars 16 located above cam support 24 being supported by cam followers 20 located within cam track 26 while roller chain 18 is spaced from sprockets 28 and 32 and with cross bars 16 located below and to the sides of cam support 24 being supported by roller chain 18 located upon and being supported by sprockets 28 and 32 while cam followers 20 are spaced from cam support 24.

At least one cam support 24 further includes a cam track 82 adjustably mounted thereon for engagement by cam followers 74. In the most preferred form, cam track 82 is mounted by a mounting plate 84 which is adjustably mounted to a base plate 86 by an adjustment slot 88. Base plate 86 in turn is adjustably mounted to cam support 24 by adjustment slots 90 extending generally perpendicular to slot 88. When cam followers 74 engage cam track 82, shaft 70 is pivoted to move against the bias of springs 78 so that portions 12a and 12b pivot from their first, abutting position to their second, open position and then back to their first, abutting position.

For purposes of pivoting pin system 11 about drive shaft 22, a turnbuckle 40 is provided having a first end pivotally mounted to pedestal 38 of cam support 24 about a first pivot axis and having a second end pivotally mounted to the free end of a crank arm 42 about a second pivot axis parallel to and spaced from the first pivot axis. Crank arm 42 is rotatably fixed to a shaft 44 which is rotatably supported generally parallel to and spaced from the first and second pivot axes by any suitable means. Shaft 44 is rotated by any suitable means and may be manually rotated such as through the use of a hand wheel connected to shaft 44 through suitable gearing.

Containers 14 are supported by a conveyor 54 such as a flight chain, with conveyor 54 located such that pins 12 of cross bars 16 located above sprockets 28 extend above the top surface of conveyor 54 and with pins 12 of cross bars 16 located along cam support 24 being positionable to extend from positions below to positions above the top surface of conveyor 54 at various heights. Containers 14 are held on conveyor 54 by first and second rails, with the first rail being positioned to extend along and closely adjacent a corresponding row of pins 12 of cross bars 16 and with the second rail being generally parallel to and spaced from the first rail a distance generally equal to the lateral dimension or diameter of containers 14 for receiving containers 14 between the first and second rails. The first and second rails must have a sufficient height to contain containers 14 of various sizes on conveyor 54 which in the preferred form is relatively narrow and without great concern on whether containers 14 are perfectly centered on conveyor 54. The first and second rails are mounted for lateral adjustment by any suitable means. In the most preferred form, the first rail is located adjacent a row of pins 12 and would require only fine tune adjustment to allow proper entry of pins 12 into the window between containers 14 created by their generally cylindrical outer surface.The second rail in the most preferred form is adjustable according to the size of container 14 to insure that containers 14 are generally aligned in a row on conveyor 54.

In a packaging operation, several lanes of product containers 14 enter the infeed of a packaging machine with the outside surfaces of containers 14 in each lane abutting with each other. Many types of containers 14 which are desired to be packaged do not have flat ends which abut together but rather have cylindrical or other configurations which result in windows, interstices, or spaces between adjacent abutting containers 14 in the lane.

It can then be appreciated that pin system 11 is in the form of an endless loop including a first portion where pins 12 extend above conveyor 54 and travel in the same direction as conveyor 54 and a second portion where pins 12 are located below conveyor 54. The first portion of the endless loop is divided into introduction, transitory, and separation sections. In the introduction and transitory sections of the endless loop, portions 12a and 12b of pins 12 are in their first, abutting position and have generally equal spacings equal to the spacing between the windows between containers 14. In the separation section of the endless loop, portions 12b of pins 12 have a gradually increasing spacing and portions 12a of pins 12 gradually pivot from the first, abutting position to their second, open position, with the free ends of portions 12a moving away from the free ends of portions 12b in the same direction of movement as conveyor 54 and pins 12 in the first portion of the endless loop. The speed of conveyor 54 is faster than roller chain 18 in the first portion of the endless loop, with the speed of portions 12a of pins 12 in the separation section of the endless loop being generally equal to the speed of conveyor 54, i.e. the speed of roller chain 18, plus the increasing spacing between portions 12b of adjacent pins 12, and plus the relative movement of portions 12a to portions 12b is generally equal to the speed of conveyor 54.

Now that the basic teachings of container metering device 10 according to the preferred teachings of the present invention have been set forth, the operation and subtle features of device 10 can be explained and appreciated. As containers 14 are transported by conveyor 54, pins 12 of pin system 11 with portions 12a and 12b being in their first, abutting position are introduced in the windows between containers 14 during the introduction section of the endless loop of pin system. As the speed of conveyor 54 is faster than roller chain 18, containers 14 are held by pins 12, with the leading edges of containers 14 abutting with portions 12b of pins 12. Thus, containers 14 will slide on conveyor 54 which is traveling faster than containers 14 being held by portions 12b of pins 12 moving with roller chain 18 during the introduction and transitory sections of the endless loop. During the separation section of the endless loop, the spacing between portions 12b of adjacent rows of pins 12 increases and portions 12b gradually retract below conveyor 54 allowing the row of containers 14 to be gradually released by portions 12b of pins 12, with the speed of containers 14 gradually increasing from the speed of roller chain 18 to that of conveyor 54 creating a gap between adjacent containers 14 or in other words the trailing edges of the first row of containers 14 do not abut with the leading edges of the next row of containers 14 still being held by the next row of pins 12. It can then be appreciated that operation of portions 12b of pins 12 of the present invention correspond directly to the operation of pins 12 as shown and described in U.S. Pat. No. 4,832,178. However, rather than completely depend on the friction between containers 14 and conveyor 54 (which can be inconsistent because of various conditions), during the separation section of the endless loop and specifically as the spacing between portions 12b of adjacent rows of pins 12 increases, portions 12a of pins 12 pivot from their abutting position to their open position and abut with the trailing edges of containers 14 to push containers 14 in the direction of travel of conveyor 54 in the event that containers 14 would have a tendency to slip on conveyor 54 rather than travel therewith. Thus, device 10 according to the teachings of the present invention provides mechanical force separation between the first row of containers 14 and the next row of containers 14 to insure that the gap between adjacent containers 14 is consistent. The size of the gap between adjacent containers 14 which is needed in order to allow entry of an overhead flight bar of the packaging machinery which defines the pack pattern can then be controlled by the relative speeds of roller chain 18 and conveyor 54.

The most preferred form of device 10 according to the teachings of the present invention includes the method described in U.S. Pat. No. 4,832,178 for providing separation of a range of varying sized products which can be easily and simply achieved when it is desired to meter different sized containers without the use of change parts. It can then be appreciated that the improved pin system 11 according to the teachings of the present invention can be applied to other types and forms of container metering devices whether or not they include provisions for providing separation of a range of varying sized products or the type of such provisions if included.

According to the teachings of the present invention, device 10 may be mechanically simple and does not require complicated drive systems. For example, the speed of roller chain 18 may be constant allowing a direct drive without the use of drive systems developing a sinusoidal motion to change the pin pitch as the machine cycles. Further, a separate drive system is not required to pivot portions 12a relative to portions 12b of pins 12 of pin system 11. Thus, device 10 according to the teachings of the present invention is of a simplified construction having a greatly reduced number of parts.

Now that the basic teachings of the present invention have been explained, many extensions and variations will be obvious to one having ordinary skill in the art. For example, although pins 12 are shown in the drawings as being insertable between each container 14 in the preferred form, the teachings of the present invention may be applicable to separation of groups of containers 14 corresponding to the pack pattern of the container packaging.

Although in the preferred form device 10 according to the teachings of the present invention includes several unique features in what is believed to be a particularly advantageous and synergistic combination, it can be appreciated that such features may be utilized separately and/or in combination with other features to provide a unique container metering device according to the teachings of the present invention.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. In a device for metering at least one lane of containers on a conveyor and including a pin system having pins, with the containers abutting each other in the lane and having windows between adjacent containers into which the pins of the pin system are insertable, with the pin system including a driven flexible member in the form of an endless loop including the pins, an improved pin system wherein each of the pins are longitudinally split generally perpendicular to the lane of containers into a first portion and a second portion, with the metering device further comprising, in combination: means for movably mounting the first portions relative to the second portions between an abutting position and an open position, with the pins being insertable into the windows when the first and second portions are in the abutting position and movable to the open position, with the first and second portions being spaced in the open position to gap the containers in the lane; and means for moving the first portions relative to the second portions 2. The metering device of claim 1 wherein the first portion extends at an angle to the second portion in the open position.

3. The metering device of claim 2 wherein the movably mounting means comprises means for pivotally mounting the first portion relative to the second portion.

4. The metering device of claim 3 further comprising, in combination: cross bars mounted on and around the endless loop, with the second portions of the pins mounted on the cross bars; and wherein the pivotally mounting means comprises rods pivotally mounted to the cross bars, with the first portions of the pins mounted on the rods.

5. The metering device of claim 4 wherein the moving means comprises, in combination: means for biasing the first portion from the open position to the abutting position; and means for moving the first portion against the bias of the biasing means.

6. The metering device of claim 5 wherein the moving means comprises, in combination: a crank arm secured to the rod; and a cam for engaging the crank arm to pivot the rod.

7. The metering device of claim 6 wherein the first portion is the leading portion and the second portion is the trailing portion.

8. The metering device of claim 3 wherein the flexible member passes over and is driven by a drive sprocket connected to a drive shaft; and wherein the metering device further comprises, in combination: an idler sprocket; a cam support extending between the drive sprocket and the idler sprocket, with the flexible member extending around the idler and drive sprockets and being supported by the cam support, with the cam support including a cam track; and followers operatively attached to the second portions of the pins of the flexible member for engagement with and guiding by the cam track of the cam support.

9. The metering device of claim 8 wherein the device meters a plurality of lanes of containers; wherein the pins are mounted to cross bars secured to the flexible member; and wherein the followers are mounted to the cross bars.

10. The metering device of claim 9 wherein the moving means comprises, in combination: a cam secured to the cam support; and followers operatively attached to the first portions of the pins for engagement with and guiding by the cam secured to the cam support.

11. The metering device of claim 10 wherein the pivotally mounting means comprises rods pivotally mounted to the cross bars, with the first portions of the pins mounted on the rods; and wherein the moving means comprises, in combination: a crank arm secured to the rod; and a cam for engaging the crank arm to pivot the rod.

12. The metering device of claim 11 wherein the moving means further comprises, in combination: means for biasing the first portion from the open position to the abutting position.

13. The metering device of claim 12 wherein the biasing means comprises a spring extending between the crank arm and the cam support.

14. The metering device of claim 8 wherein the moving means comprises, in combination: a cam secured to the cam support; and followers operatively attached to the first portions of the pins for engagement with and guiding by the cam secured to the cam support.

15. The metering device of claim 1 wherein the moving means comprises, in combination: means for biasing the first portion from the open position to the abutting position; and means for moving the first portion against the bias of the biasing means.

16. The metering device of claim 1 wherein the first portion is the leading portion and the second portion is the trailing portion.

17. Device for metering at least one lane of at least first and second containers comprising, in combination: a conveyor for conveying the containers abutting each other in the lane and having windows between adjacent containers; a plurality of first pin portions; a plurality of second pin portions; and means for inserting one of the first pin portions in the windows between adjacent containers and for simultaneously inserting one of the second pin portions in the windows between adjacent containers with the second pin portions holding the second container from moving at the same speed as the conveyor and then for moving the first pin portion to push the first container on the conveyor as the first pin portion withdraws from the window while simultaneously moving the second pin portion to withdraw from the window allowing the second container to move with the conveyor.

18. The metering device of claim 17 wherein the inserting and moving means inserts both of the pin portions from below the conveyor and withdraws both of the pin portions to a position below the conveyor.

19. The metering device of claim 18 wherein the inserting and moving means comprises, in combination: a driven flexible member in the form of an endless loop; means for mounting the second pin portions on and around the endless loop; and means for movably mounting the first pin portions to the means for mounting the second pin portions.

20. The metering device of claim 19 wherein the movably mounting means comprises means for pivotally mounting the first pin portions to the means for mounting the second pin portions.

* * * * *